US008747211B2

(12) United States Patent
Vallejo et al.

(10) Patent No.: US 8,747,211 B2
(45) Date of Patent: Jun. 10, 2014

(54) WAGERING GAME DEVICE WITH A MULTIPLE-PROGRESSIVE WHEEL GAME

(71) Applicant: Bally Gaming, Inc., Las Vegas, NV (US)

(72) Inventors: John Vallejo, Henderson, NV (US); Michael Mitchell, Las Vegas, NV (US); Loren T. Nelson, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/028,273

(22) Filed: Sep. 16, 2013

(65) Prior Publication Data

US 2014/0018164 A1 Jan. 16, 2014

Related U.S. Application Data

(63) Continuation of application No. 13/568,680, filed on Aug. 7, 2012, now Pat. No. 8,371,935, which is a continuation of application No. 12/401,822, filed on Mar. 11, 2009, now Pat. No. 8,246,452, which is a continuation-in-part of application No. 11/871,323, filed on Oct. 12, 2007, now abandoned, said application No. 12/401,822 is a continuation-in-part of application No. 11/233,923, filed on Sep. 22, 2005, now Pat. No. 7,727,069, application No. 14/028,273, which is a continuation of application No. 13/762,193, filed on Feb. 7, 2013, now Pat. No. 8,535,148.

(60) Provisional application No. 60/865,641, filed on Nov. 13, 2006, provisional application No. 60/615,710, filed on Oct. 4, 2004, provisional application No. 60/620,190, filed on Oct. 19, 2004.

(51) Int. Cl.
*A63F 13/00* (2014.01)

(52) U.S. Cl.
USPC .............................................. 463/17; 463/27

(58) Field of Classification Search
CPC ........ A63F 13/00; G07F 17/326; G07F 17/34
USPC ................................... 463/16, 17, 20, 26, 27
See application file for complete search history.

(56) References Cited

U.S. PATENT DOCUMENTS

| | | | | |
|---|---|---|---|---|
| 5,788,573 | A * | 8/1998 | Baerlocher et al. | 463/16 |
| 6,869,359 | B1 * | 3/2005 | Mathews | 463/17 |
| 2004/0048645 | A1 * | 3/2004 | Webb et al. | 463/16 |
| 2004/0171417 | A1 * | 9/2004 | Beaulieu et al. | 463/20 |
| 2005/0026673 | A1 * | 2/2005 | Paulsen et al. | 463/16 |

* cited by examiner

*Primary Examiner* — James S McClellan
(74) *Attorney, Agent, or Firm* — Marvin Hein

(57) ABSTRACT

A method and gaming machine are disclosed for operating a game with a primary and embedded game. An embedded game is disclosed as a bonus game with one embodiment animating miniature reels inside the primary game symbol. Each embedded slot game may have its own progressive, or may be tied into the progress associated with the primary game. Each embedded slot game will have its own paytable, and may be a miniature version of a well-recognized full-sized slot game. Also disclosed are a wagering game, a gaming machine and a networked gaming system and associated methods including a multiple-progressive wheel game. A player may win all of a set of wheel-based progressive award during play of a single game.

4 Claims, 9 Drawing Sheets

Game Device With Embedded Reel Games Including Embedded Progressives Associated With One Or More Embedded Reel Game Method For Playing Embedded Reel Games

WAGERING GAME DEVICE WITH A MULTIPLE-PROGRESSIVE WHEEL GAME

RELATED APPLICATIONS

This application is a continuation of co-pending U.S. patent application Ser. No. 13/762,193 filed Feb. 7, 2013, which is a continuation of U.S. patent application Ser. No. 13/568,680 filed Aug. 7, 2012, which is a continuation of U.S. patent application Ser. No. 12/401,822 filed Mar. 11, 2009, now U.S. Pat. No. 8,246,452, which is a continuation-in-part of U.S. patent application Ser. No. 11/871,323 filed Oct. 12, 2007, which claimed the benefit of provisional application 60/865,641 filed on Nov. 13, 2006. Application Ser. No. 12/401,822 is also a continuation-in-part of U.S. patent application Ser. No. 11/233,923 filed Sep. 22, 2005, now U.S. Pat. No. 7,727,069, which claimed the benefit of provisional application 60/615,710 filed on Oct. 4, 2004 and provisional application 60/620,190 filed on Oct. 19, 2004.

The above referenced applications are hereby incorporated by explicit reference in their entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is directed to wagering games, gaming machines and networked gaming systems and methods and, more particularly, to wagering games, gaming machine and networked gaming systems and methods including multiple-progressive wheel games.

2. Description of the Related Art

Reel gaming machines with static reel symbols are known. Current reel games use either mechanical reels or show a video representation reels. Various modifications have been made over the years to create additional interest in standard reel games. An example improvement can be found in U.S. Pat. No. 6,731,313 to Kaminkow, where a player can make manual requests to change reel symbols. Another is U.S. Pat. No. 6,702,675 to Poole, which discloses animal animations on reel symbols.

In the prior art, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting. Some gaming machines offer a player the opportunity to win millions of dollars by providing progressive jackpots. Additionally, feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays.

While gaming machines including feature games have been very successful, there remains a need for games that provide a player with enhanced excitement and increased opportunity of winning.

SUMMARY OF THE INVENTION

Presently disclosed is a novel and non-obvious embedded reel game. The game comprises a reel game which is typically a 5 reel, 20 payline game, but the present invention can be implemented using any number of reels or paylines, from 1 to any number that is comfortable to players. Included on the reels is at least one, and preferably one per reel, special symbols which appear to be, or visually corresponds to, a miniature reel machine. One embodiment has three miniature reels therein. When the miniature reels are in the right position (a win event in the main game), the miniature reel game symbol animates and plays a complete, standalone game of its own. This includes having its own paytable and, where applicable, its own progressive. These miniature reel games may be unique to the game, or may be miniature representations of actual full-size reel games. If the miniature game is a small version of a full-size game, the full-size game's paytable will be used. The player is awarded any winnings from the spin of the miniature reel game, after which the main game continues.

The bonus games disclosed herein may be configured for use with reel games having as few as a single reel. The paytables in such a game would be configured to trigger bonus rounds more frequently than is typical in multi-reel games, allowing quick repetitive play and frequent bonus game play. This provides additional pleasure to players wanting the visual enjoyment of the miniature reel game presented in this disclosure.

Another embodiment of the present inventive concept involves having "telescoping" embedded miniature reel games. Upon a first bonus game trigger, the embedded miniature reel games are triggered. Each embedded miniature reel game will have, on its reels, symbols corresponding to its own embedded reel games. Because it would be too difficult to see more than one level of embedded reels, a faux magnifying glass effect would be used in the area of the miniature embedded reel game. When the first level embedded reel game is played, it is enlarged as if looking through a magnifying glass placed over a portion of the main display screen. This allows the second-level embedded miniature reel games to be visible inside the first level embedded miniature reel game. If a win event occurs in the first level embedded miniature reel game that triggers its own embedded miniature reel games (the second level games), these second level games are animated and played. If the second level reel games have embedded reel games, these will be further magnified until a maximum level of embedded game is reached.

Telescoping embedded games need not be represented as miniature games; other visual representations could be used.

Embedded reel games may be shown using bonus game symbols that, when triggered, are associated with an embedded reel game, or may be a picture of the embedded reel game itself. The embedded reel games, when triggered, may be shown as a direct animation of the bonus game symbol, as an overlay animation of the bonus game symbol, or may be shown in a different section of the screen. If used with mechanical reels, the embedded games would be shown on a separate video display. The embedded games may be miniature reel games or may be shown as substantially the same size as the main game. "Embedded" refers to the concept of triggering a bonus reel game from inside a main reel game, and bringing the triggered reel game to life while allowing most of the primary game to remain visible (how much depends on how big the embedded reel games are made by game designers). In one embodiment, the embedded reel games are genuinely miniature, being 1/10 or less the size of the main game. This greatly enhances the "cute" effect of the embedded bonus game. Any reduced size may be used for effect, of course. Generally anything less than ½ the size of the primary game is considered substantially smaller than the primary game and will create at least some of the desirable "cute" effect.

Each embedded reel game may be associated with a progressive jackpot. One embodiment has each embedded game associated with the same progressive game as the main game. Alternatively, each embedded game may have its own progressive jackpot.

In yet another embodiment, each embedded game is associated with a jackpot contributed to by other embedded games, the other embedded games being all embedded games in a bank, or, other embedded games in a wide area progressive.

In accordance with another embodiment of the present invention, a game device includes at least one processor, interfaces coupling the processor to a player input device and a display, a connection coupling the at least one processor to an external network and at least one memory device storing a commercial operating system and software under control of the processor for displaying a game on the display. The game includes a first game having a set of game plays, at least one of the game plays occurring after activation of the player input device by a player, and a second game including a plurality of second game plays, the second game plays occurring after a triggering event of the first game. The game further includes at least one wheel capable of indicating awards which may be won as a result of the second game plays, at least one of the awards comprising one of a set of progressive awards; w herein each second game play is visually_associated with a different aspect of the triggering event and wherein indicia on the wheel have been configured according to the different aspect of the triggering event; and one of the set of progressive awards winnable only on its respective associated second game play. The entire set of progressive awards may be won as the result of the triggering event.

Features and advantages will become apparent from the following detailed description, taken in conjunction with the accompanying drawings, which illustrate by way of example, the features of the various embodiments.

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Figure 1:
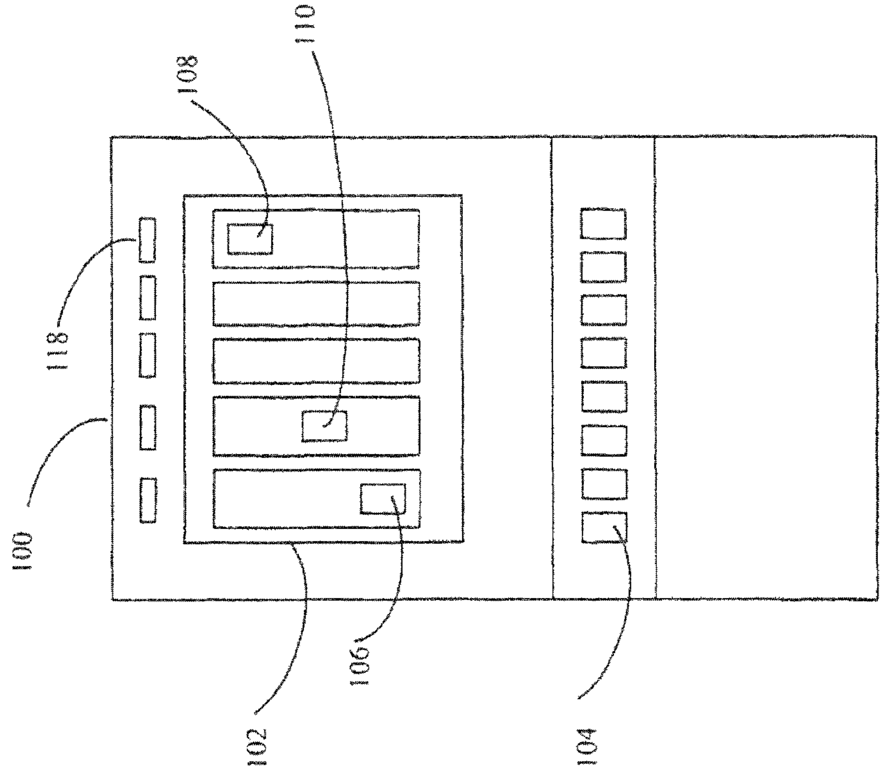
FIG. 1 is a functional block diagram of an example game device in accordance with one embodiment of the present invention.
Figure 1:
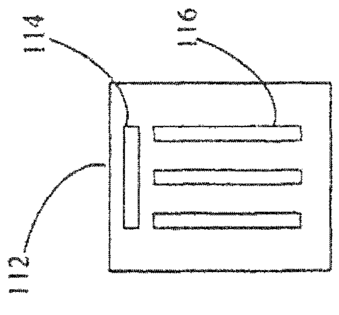
Figure 2:
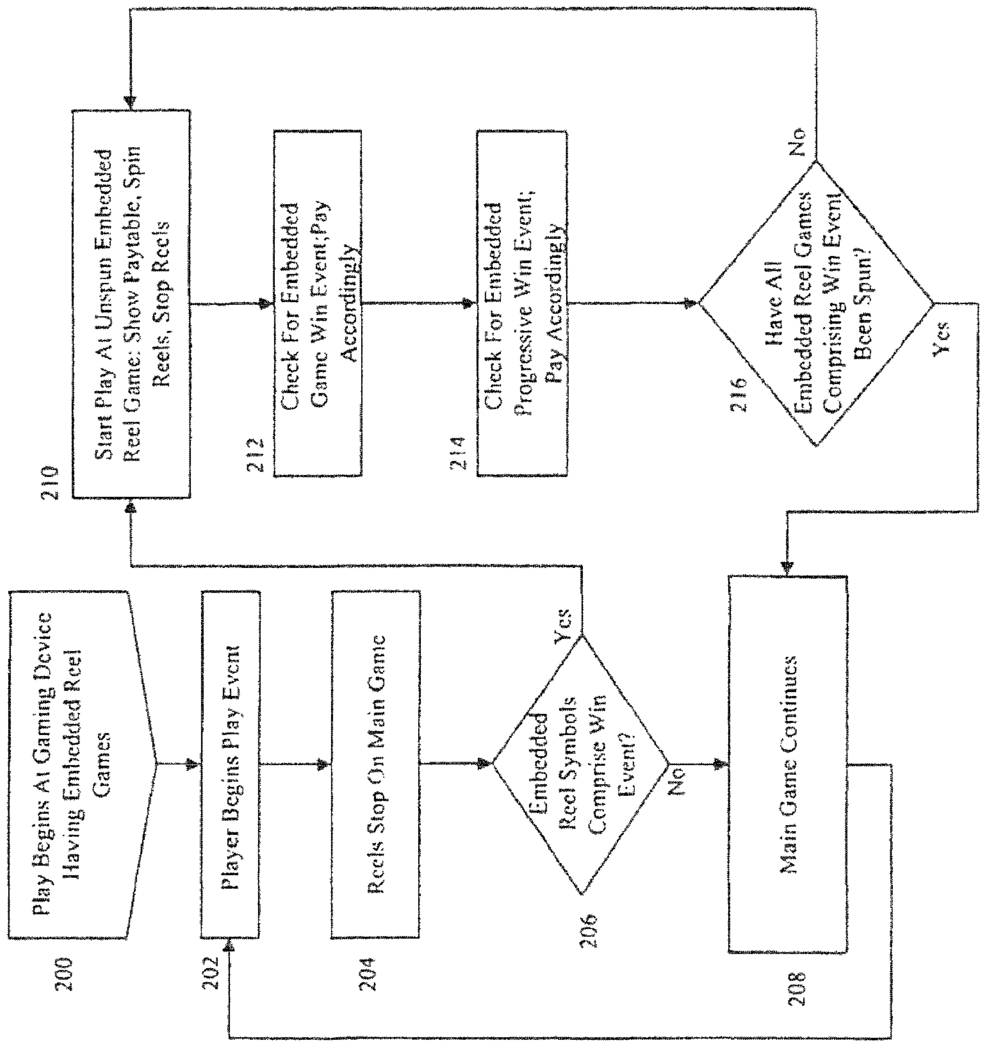
FIG. 2 is a flow diagram illustrating embedded reel game play in accordance with one embodiment of the present invention.

Referring to the drawings, for illustrative purposes, one or more embodiments of the present invention is shown embodied in FIGS. 1 and 2. It will be appreciated that the apparatus may vary as to configuration and as to details of the parts, and that the method may vary as to details, partitioning, and the order of the acts, without departing from the inventive concepts disclosed herein.

FIG. 1 shows a game device according to the present invention. The game device has a cabinet 100 encloses a video display 102 and a set of standard game play buttons shown generally as buttons 104. The game device also comprises the internal hardware and software needed for gaming devices, including at least one processor, dynamic memory, non-volatile memory, system support circuitry such that a commercial operating system such as Linux will operably run therein, and I/O connections including interfaces to the various player devices such as buttons 104 and video 102. Further, it is expected that most embodiments will have an external network connection. Also included is the software needed to implement the specific game. The internals are not illustrated.

In addition to many features that are typical to a game device, the new and unique addition to reel gaming is shown in FIG. 1. There are five reels shown on video screen 102 as rectangular boxes. The main game will have its paytable and theme. In addition to the main game, there will be a special bonus symbol that, in one preferred embodiment, looks like 3 tiny reels in a tiny game display. Any number may be used in the miniature games, with one preferred embodiment using 3 reels with standard 17" or 19" screens, and using 3, 4, or 5 miniature reels in larger screens such as 27" or 32" LCD screens. When the bonus symbol appears in a winning location, a special event occurs.

Shown in FIG. 1 are three miniature reel symbols in locations 106, 110, and 108 after the reels have come to a stop in the main game. Shown is one embodiment where the player enters the bonus round if 3 of the miniature reel symbols show anywhere on the screen, making a scatter pay. The inventive bonus games disclosed herein may be triggered in any manner a game designer wishes.

Embedded reel window 112 corresponds to one of the embedded reel symbols 106, 108, or 110. Shown are three miniature reels 116 that will be "spun" (in actuality, visually simulating reel spins on a video screen). Also shown is progressive display meter 114. Progressive display meter 114 will contain a numeric value corresponding to the current value of the progressive associated with this particular embedded reel game. The progressive amount may be displayed in any convenient manner, including being shown as individual (per reel) banners or displays on the main reel game 118.

FIG. 2 illustrates game play with embedded reel games. Box 200 comprises those actions associated with a player choosing to play a reel game having embedded reel games. Continuing into box 202, the player begins play at the main game level, setting the main reels in motion. Box 204 corresponds to the main game finishing a spin, and the reels stopping. After the main reels stop, diamond 206 corresponds to the actions needed to determine if the miniature reel symbols found in the viewable area (102 of FIG. 1) comprise a win event that triggers play of the miniature reel games. If the answer is "No", diamond 206 is left for box 208. The actions corresponding to box 208 are any further actions needed to finish this game at the main level (for example, there may be other bonus win events that occurred in the same game and needing payout). After this game is completed, box 208 is left for box 202, where a next game is initiated.

Returning to diamond 206, if the answer is "Yes" then box 210 is entered. The actions corresponding to box 210 include those needed to generate and display one set of reel spins for an embedded reel game. One of the un-spun embedded reel symbols is animated. The order of playing each enabled bonus embedded reel game doesn't matter, but it is expected that most game developers will choose to traverse the winning miniature reel symbols in left-to-right, top-to-bottom order. The symbol that is the representation of an embedded reel game either becomes animated in and of itself, or, is visually replaced with a representation of a set of reels of the reel game that is associated with the bonus game symbol.

A preferred embodiment is for the game to appear in miniature where the bonus symbol is; preferably the bonus symbol is the game and it appears to animate as the player watches. However, some game designers may want to have the embedded reel games play off to one side, above, in a different screen, or any other way attractive to a player. Whichever case is used in an implementation, the embedded reel game has its reels begin to spin. In one embodiment the paytable associated with the embedded reel game is shown to the right of the symbol. It may be shown in any way a game designer wishes. The order of these events is not important; for example, the paytable may be shown to the player first, and the player indicate when she or he is ready to start the embedded reel game with the touch of a button; alternatively, the paytable my be displayed during the entire time the embedded reel game is being played. One embodiment has the paytable appear as a side-pull pop-out display, which appears to slide out from the right of the symbol. Embedded reel game paytables may be shown to a player in any way, including being part of the static display on the game cabinet.

After the miniature reels stop, box 210 is left for box 212. The actions corresponding to box 212 include checked for and/or paying to the player any credits won based on the reels' final position. Box 212 is left for box 214, where the actions corresponding to this box include evaluating the stopped reels for a progressive win event.

The progressives associated with each embedded reel game may be implemented in any way suitable to the game designers. One preferred embodiment has a separate progressive associated with each embedded reel game (each different embedded reel game). In this embodiment, each reel of the 5 reels that make up the main reel game has one embedded reel game symbol associated with it. This is different from the embedded reel game found on each of the other four reels. A win event comprises two or more embedded reel game symbols appearing as a scatter pay (anywhere on two different reels). Thus, a win event may be comprised of 2, 3, 4, or 5 embedded reel game symbols on a 5-reel main game. In this embodiment each of the embedded reel games is a different game, and each will have its own progressive. It is thus possible for a player to win from 2 to 5 progressives during the play of a single embedded reel game bonus event!

Any configuration of progressives may be used with the present invention. This includes having a single progressive associated with any or all of the embedded games, which has the advantage of building a single higher jackpot over a plurality of smaller jackpots. Other embodiments include using the same progressive with the embedded reel games as is used with the main game. In this case, a player has the possibility of winning the current progressive up to 6 times on a single play (once on the main game, and once each on each of the embedded reel games up to 5). If this later embodiment is used, a preferred part of the embodiment would include the use of seed money or an initial minimal jackpot amount used in the funding of the progressive jackpot.

The winnings for the collective bonus round are built into the paytable of the main reel game based on the average win per game of the miniature games' paytables, totaled for the number of symbols comprising each win event. Progressives are expected to be funded in the same manner as is currently used for the main reel of the present invention; however, any method of funding progressive jackpots may be used. Use of existing reel games as the embedded reel games was chosen based on brand and game recognition by players, but is not a requirement to practice the present invention. The miniature reel games may be custom made for each game having this bonus. Any number of miniature games may be used for the winning symbols, including the use of a single miniature reel game and a single bonus symbol; the miniature reel games may use any number of reels; variable paytables may be used based on the number of credits a player is making; etc. Further variations of the embedded reel games will come to the mind of a person skilled in this art and who has the benefit of the present disclosure; these variations are within the inventive scope of the present disclosure.

Upon evaluation and payout of any progressive win amount, box 214 is left for diamond 216. If all the symbols corresponding to embedded reel games have been played, then the "Yes" exit is taken to box 208 where any remaining actions associated with the main game are continued. If the answer is "No", then box 210 is re-entered and another miniature reel game is played. The loop comprised of boxes 210, 212, and 214 with diamond 212 continues until all the symbols that made up the current win event have their associated miniature reel games played. After that occurs, the main game is completed and the player is ready to initiate the main game again.

The presently preferred embodiment has each miniature reel game in the bonus round play in sequence. Another embodiment has all of the miniature reel games play in parallel, which creates more excitement at the expense of possible confusion by some players. Upon the completion of each miniature reel game any winnings are added to the player's credit meter.

Various other embodiments are directed to a game and method for playing a game, wherein the game includes a multiple-progressive wheel component. Embodiments of the game and method are illustrated and described herein, by way of example only, and not by way of limitation. Referring now to the drawings, and more particularly to FIGS. 3-9, there are shown illustrative examples of a game and a method for playing a game in accordance with various aspects of the invention.

Figure 3:
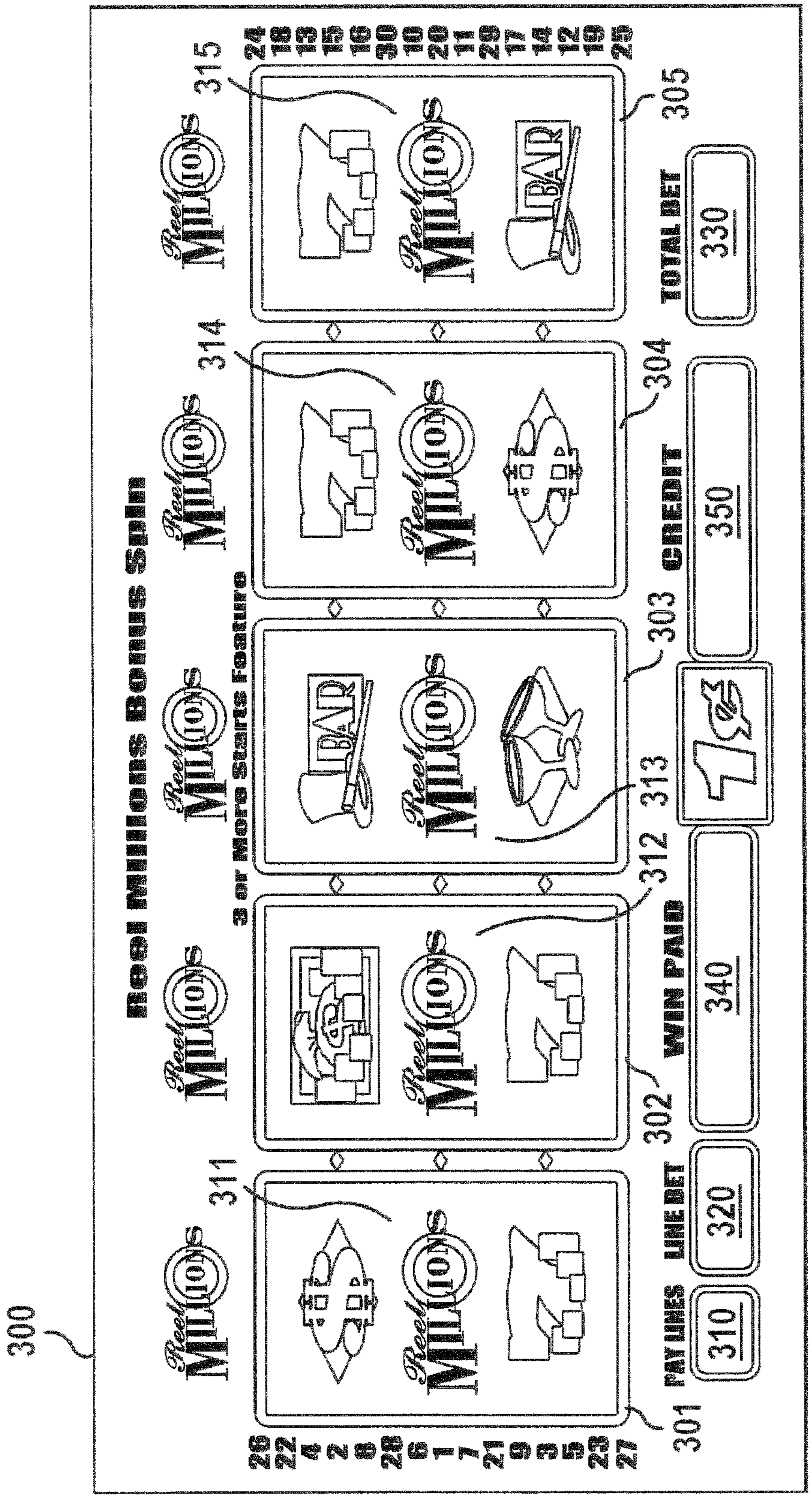
FIG. 3 provides an overview of a game of one embodiment of the invention.

Turning now to FIG. 3, in accordance with one aspect of the invention, the Reel Millions primary game 300 is implemented using five spinning reels 301-305. Each of 20 pay line patterns (not shown) passes through one indicium on each of the five reels. The number of pay lines and their patterns are by way of example only and may vary. The player selects the number of played pay lines and the number of credits or coins wagered on each line using touch screen controls or gaming device control buttons. The player's selections are displayed on PAY LINES meter 310, LINE BET meter 320 and TOTAL BET meter 330 located adjacent to the reels. WIN PAID meter 340 and CREDIT meter 350 provide the player with information about the amount paid by the last game played and the total number of credits available for play. The player may collect the balance of his credits by pressing a COLLECT button (not shown).

The player initiates game play by pressing a SPIN button (not shown). In some embodiments, the player may simultaneously select all pay lines at the maximum number of coins or credits allowed per line by pressing a MAX BET button. Buttons (see FIG. 6, 660) on gaming machine 600 (FIG. 6) or touch screen buttons (not shown) may be used to perform the actions described here without deviating from the scope of the invention. Reels 301-305 are made to spin and stop in their predetermined stop positions and then indicate whether the stop positions of the reels resulted in a winning game outcome.

Figure 4:
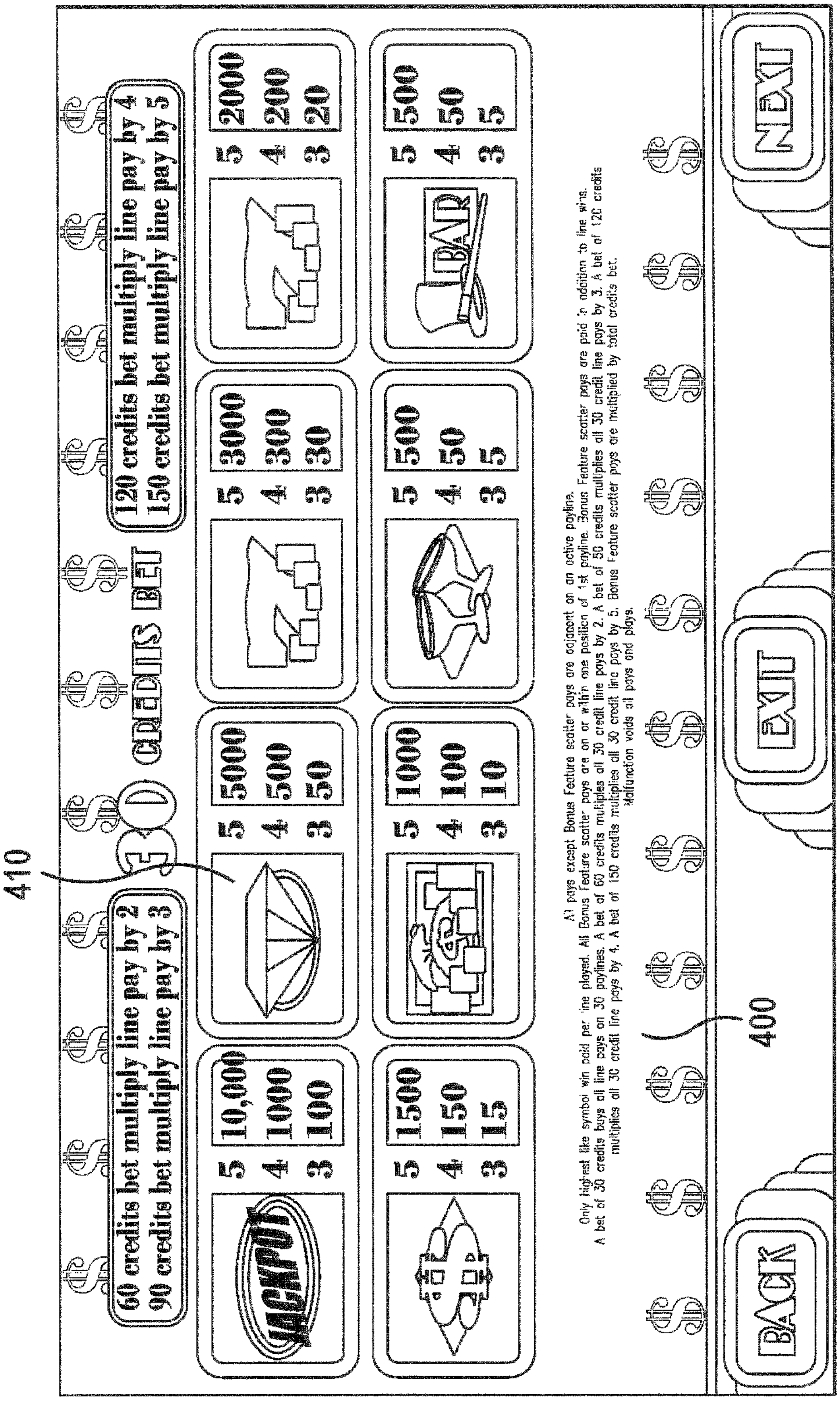
FIG. 4 is a display image associated with a help screen of one embodiment of the invention.

Winning outcomes may be indicated on a pay table. In accordance with one embodiment, part of a pay table 400 is shown in FIG. 4. The pay table may be accessible through a HELP/PAYS or similar button. In alternate embodiments, the pay table may be presented on a second video or printed display attached to the gaming device (i.e. display 653 or "pay glass" 652, FIG. 6). A winning combination, for example, could be three or more symbols adjacent to one another on an active pay line. For each winning combination, the game device awards the player the award in the pay table, adjusted as necessary based on the number of credits wagered on the pay line on which the win occurred. For example, three DIAMOND symbols 410 adjacent to one another from left-to-right on an active pay line would pay 50 times the player's wager. In some embodiments, video representations of pay tables may factor in the amount of the player's wager and no additional award adjustment is required.

In various embodiments, winning combinations may be evaluated across adjacent reels from left-to-right, from right-to-left or both. Additional winning combinations may be awarded when certain indicia do not necessarily accumulate adjacently on a pay line, but rather, appear anywhere on the reels (i.e., "scatter pays"). In addition, "wild" indicia may be used to complete winning combinations. Some "wild" indicia may also cause completed winning combinations to be result in pay amounts in excess of the normal winning combination by way of multiplication or addition, for example, a wild doubler symbol may be used.

Various primary game outcomes may be utilized to trigger the play of the feature game, including, but not limited to, awarding bonus play when certain symbols appear on a pay line, when certain symbols are scattered, when no symbols of a certain type appear, when a certain winning combination occurs or, regardless of the visible symbols, at random or fixed intervals. In the Reel Millions embodiment, the appearance of three or more REEL MILLION$ trigger symbols scattered on the reels trigger the feature game. In one embodiment, a wager of a certain amount may also be required in order to trigger the feature game. For example, the player may be required to play the maximum wager in order to be eligible. The feature game provides the player with from three to five random spins of a feature wheel pointer based on the number of REEL MILLION$ symbols triggering the feature. In the example of FIG. 3, a REEL MILLION$ symbol 311-315 appears on each of the reels 301-305, signifying that five spins of the pointer will occur during play of the feature game with each spin and its potential award associated with a different one of the triggering symbols. Thus, each spin of the wheel provides the opportunity for the player to win a different progressive prize. Up to five progressives may be won during play of a single feature game.

Figure 5:
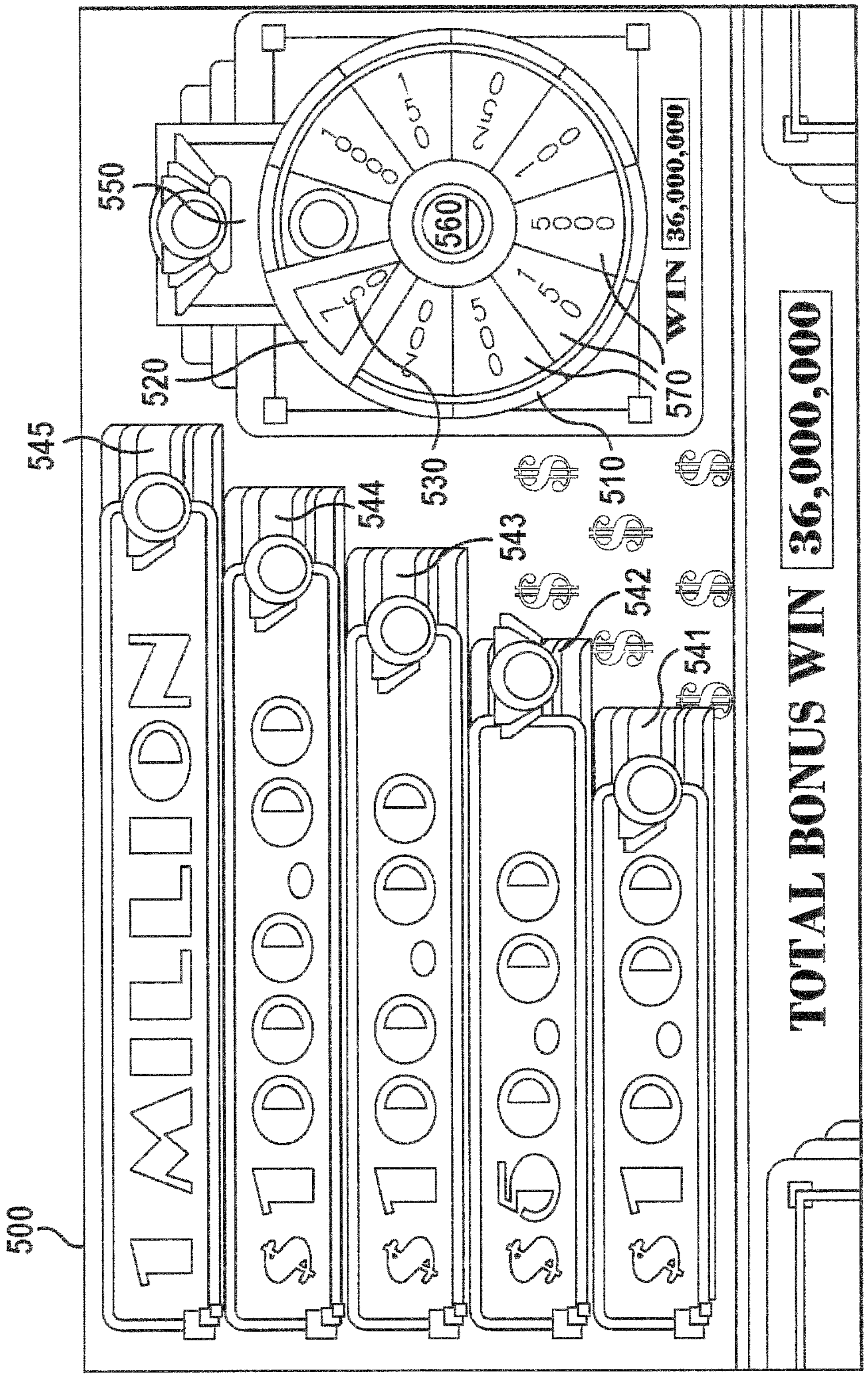
FIG. 5 is a display image associated with a feature screen of one embodiment of the invention.

As shown in FIG. 5, game display 500 presents a wheel game comprising a video representation of a wheel 510 and a pointer 520. Wheel 510 is a fixed illustration of a wheel that includes payout indicators 530 on the face thereof. Pointer 520 is located in proximity to wheel 510 so as to rotate about the illustration of wheel 510. During play of the secondary game, pointer 520 moves in a circular motion around the central axis of stationary wheel 510 and eventually comes to a stop in front of a payout indicator 530, thereby indicating a payout on wheel 510 which the player has won. Alternatively, pointer 520 is fixed and the wheel 510 spins. Various award values are identified on the payout indictors, e.g., "1000", "150", "250", "100", "5000", "PROGRESSIVE," etc. In one embodiment, the award values are changed depending on the particular spin of the wheel and one of the progressive values 541-545 is associated with "PROGRESSIVE" payout indicator 550. In some embodiments, a separate wheel is provided for each wheel spin. For example, five wheels may be dedicated to the presentation of the secondary game, each of the five wheels associated with one of the progressive values 541-545.

Conventionally, payout indicator 530 is identified by gaming software operating on or in conjunction with the gaming machine through a random generator, such as a random number generator. The random generator assists in avoiding potential defective mechanical components that may drive an unlikely number of wins or losses. In one embodiment, prior to identifying payout indicator 530, the rate of speed of the spinning portion of the wheel is adjusted to slow down to give an illusion of a free spinning device in order to build excitement and enjoyment of the player as the moment of selection builds.

In one embodiment, game display 500 includes a stationary wheel 510 having a physical pointer 520. The pointer may or may not be illuminated. Additionally, lights (not shown) are placed about the axis of wheel 510. In this and other similar embodiments, the lights may be selectively turned on and off to simulate a pointer until a selected payout indicator 520 is illuminated to identify the winning selection. The lights may be conventionally controlled by circuitry tied to the gaming machine processor and software. The lights may sequentially turn on and off to give the illusion of spinning or may randomly turn on and off until the selection is made in accordance with a conventional random number generator (not shown). Additionally, the lights may include a pointer light that is a different color from the other lights. For example, the lights may be blue and the pointer light may be red. The blue lights may remain on while the red light (which may be comprised of several consecutive lights) may be sequentially turned on and off to give the illusion of a spinning red light which ultimately will stop adjacent to the selected payout indicator 520. It may further be appreciated that the lights may comprise light emitting diodes (LEDs) with red-greenblue or similar coloring which can be activated according to an algorithm or pattern to cause particular visual affects that generate excitement or entertainment to a player.

Optionally, in an alternate embodiment, wheel 510 in game display 500 includes a moving wheel face 560 having multiple wheel segments 570 wherein separate prize amounts are indicated on each wheel segment 570. One or more fixed pointers (not shown) are located in proximity to wheel 510 so as to be adjacent to a unique wheel segment 570 when the wheel face is in a stationary mode, for example, at the conclusion of a wheel spin, in order to indicate a winning outcome.

Figure 6:
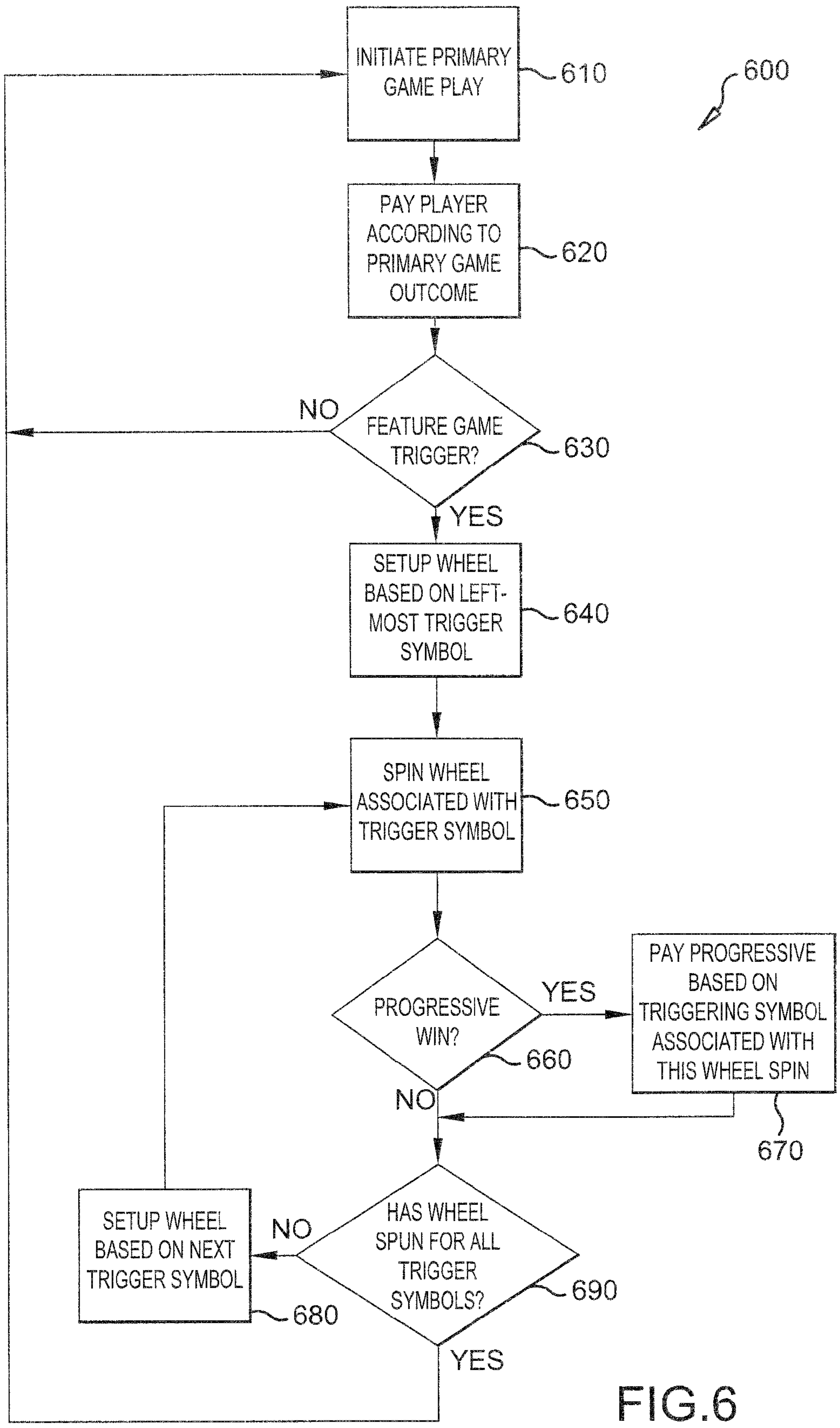
FIG. 6 is a functional block diagram depicting the steps associated with carrying out a method in accordance of one embodiment of the invention.

A logical flow diagram generally depicting the steps associated with a method 600 for carrying out a game having a multiple-progressive wheel component, in accordance with one aspect of the invention, is presented in FIG. 6. In one example implementation, a gaming program executable on a gaming processor may be prepared in accordance with conventional programming techniques and software to produced the desired affect as described by the blocks and flow paths in the flow diagram and tables below. In another example implementation, the desired effect as described by the flow diagram and tables below may be produced by utilizing an electro-mechanical apparatus, such as one using spinning reels together with a spinning wheel which may be implemented together with a random number generator configured in accordance with conventional mathematical modelling methods. The order of actions as shown in FIG. 6 is only illustrative, and should not be considered limiting. For example, the order of the actions may be changed, additional steps may be added or some steps may be removed without deviating from the scope and spirit of the invention.

First at block 610, primary game play is initiated. The player places a wager and starts the game, whereby each reel then spins or displays a representation of a slot machine reel spin before stopping with particular indicia displayed to the player. A win occurs if a series of indicia (BAR, BAR, BAR, for example) appears on one or more pay lines or scattered, as described above. The player is paid for any winning symbol combinations at block 620. At block 630, the indicia on the reels are examined to determine the existence of a combination predetermined to be a feature game trigger. For example, three or more REEL MILLION$ symbols appearing simultaneously on the reels may be considered a feature game trigger. Each of the trigger symbols may be associated with a corresponding progressive award, which may be named, as shown in TABLE 1.

TABLE 1

| Reel Symbol | Progressive Values | Jackpot Name |
|---|---|---|
| REEL MILLION$ on Reel #5 | $1 Million | Pearl Jackpot |
| REEL MILLION$ on Reel #4 | $1,000 | Topaz Jackpot |
| REEL MILLION$ on Reel #3 | $ 100 | Ruby Jackpot |
| REEL MILLION$ on Reel #2 | $ 50 | Sapphire Jackpot |
| REEL MILLION$ on Reel #1 | $ 10 | Emerald Jackpot |

If the displayed indicia do not correspond to a feature game trigger, for example, three or more REEL MILLION$ symbols, processing resumes at block 610 with play of another iteration of the primary game. Otherwise, the feature game is played at blocks 640-690.

At block 640, the wheel is setup with prizes associated with the first trigger symbol. At block 650, a random location is selected and the pointer of the wheel is then spun (or a simulated video spin occurs) and stopped at the preselected location with one of the prizes indicated by the pointer.

At block 660, a determination is made whether the prize adjacent to the fixed pointer corresponds to a progressive award. If so, the player is awarded the progressive prize associated with the trigger symbol for this spin of the wheel at block 670.

At block 670, it is determined whether any wheel pointer spins remain to be performed. For example, at the start of the feature game, it may have been determined that three wheel spins would be performed because three triggering symbols were displayed. It will be appreciated that the number of wheel spins may vary based on the number of displayed triggering symbol or according to any other criteria. If the predetermined number of wheel spins has not been completed, flow proceeds to block 680, where the wheel is setup with prizes associated with the next trigger symbol. For example, the amount of the progressive prize available on this spin of the wheel may be highlighted and other prize values associated with the various segments on the wheel may change. In some embodiments, the values on the wheel remain fixed from spin to spin.

If all wheel spins have been performed, the feature game is complete and the next primary game play is initiated at block 610. If all wheel spins have not yet been performed, processing returns to block 650 for another cycle of wheel spin and potential progressive award payment.

Figure 7:
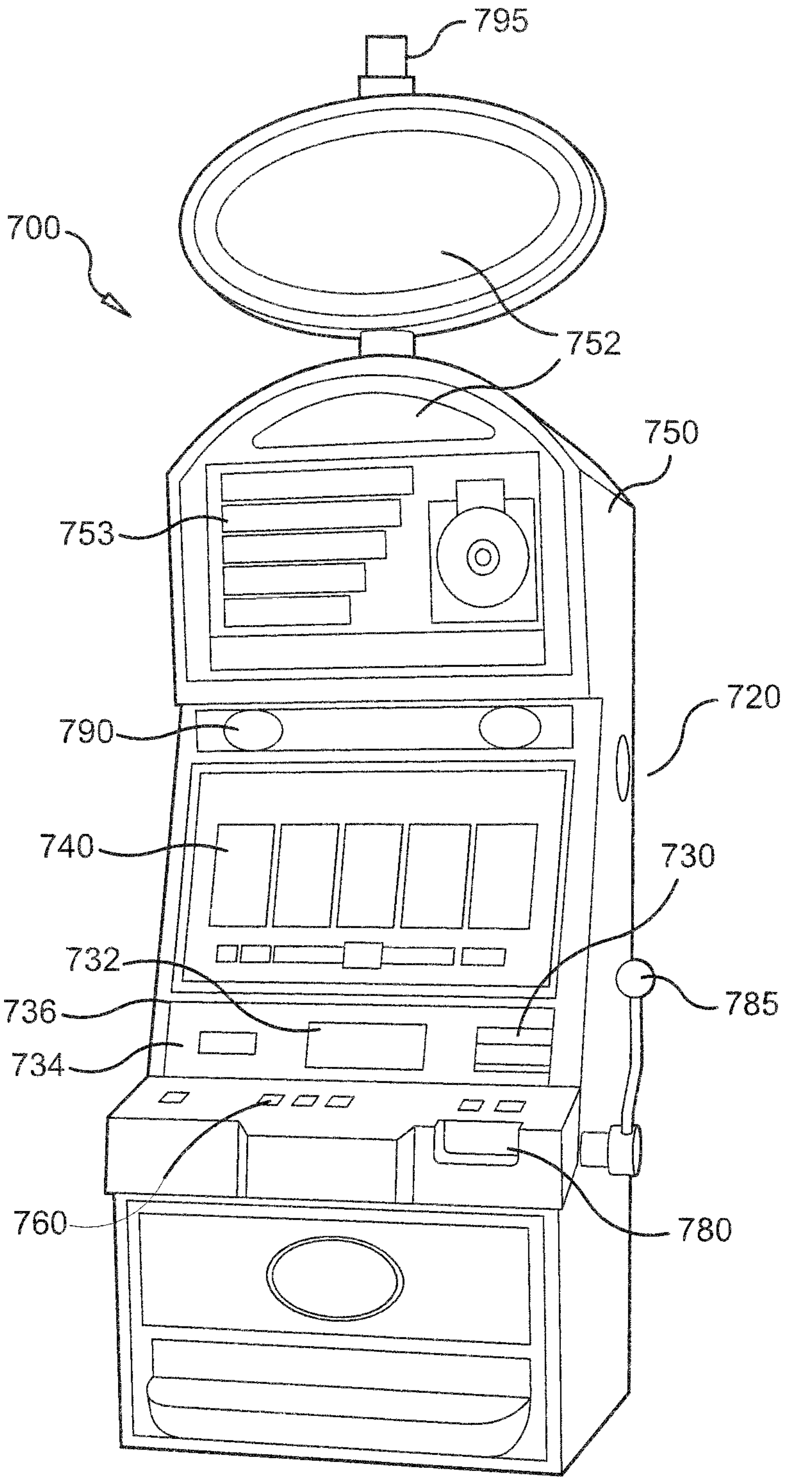
FIG. 7 is a perspective view of a gaming machine in accordance with one embodiment of the present invention.

In accordance with one embodiment, FIG. 7 illustrates a gaming machine 700 including cabinet housing 720, primary game display 740, player-activated buttons 760, player tracking panel 736, bill/voucher acceptor 780 and one or more speakers 790. Cabinet housing 720 is a self-standing unit that is generally rectangular in shape and may be manufactured with reinforced steel or other rigid materials which are resistant to tampering and vandalism. Cabinet housing 720 houses a processor, circuitry, and software (not shown) for receiving signals from player-activated buttons 760, operating the games, and transmitting signals to the respective displays and speakers. Any shaped cabinet may be implemented with any embodiment of gaming machine 700 so long as it provides access to a player for playing a game. For example, cabinet 720 may comprise a slant-top, bar-top, or table-top style cabinet. The operation of gaming machine 700 is described more fully below.

The plurality of player-activated buttons 760 may be used for various functions such as, but not limited to, selecting a wager denomination, selecting a game to be played, selecting a wager amount per game, initiating a game, or cashing out money from gaming machine 700. Buttons 760 function as input mechanisms and may include mechanical buttons, electromechanical buttons or touch screen buttons. Optionally, a handle 785 may be rotated by a player to initiate a game.

In other embodiments, buttons 760 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 720 may optionally include top box 750 which contains "top glass" 752 comprising advertising or payout information related to the game or games available on gaming machine 700. Player tracking panel 736 includes player tracking card reader 734 and player tracking display 732. Voucher printer 730 may be integrated into player tracking panel 736 or installed elsewhere in cabinet housing 720 or top box 750.

Game display 740 presents a game of chance wherein a player receives one or more outcomes from a set of potential outcomes. For example, one such game of chance is a video slot machine game, an example of which is entitled Reel Millions, described above. In other aspects of the invention, gaming machine 700 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, one or more wheels, or dice as required to present the game to the player. In video/mechanical or pure video embodiments, game display 740 is, typically, a CRT or a flat-panel display in the form of, but not limited to, liquid crystal, plasma, electroluminescent, vacuum fluorescent, field emission, or any other type of panel display known or developed in the art. Game display 740 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 740 preferably includes a touch screen or touch glass system (not shown) and presents player interfaces such as, but not limited to, credit meter (not shown), win meter (not shown) and touch screen buttons (not shown).

Game display 740 may also present information such as, but not limited to, player information, advertisements and casino promotions, graphic displays, news and sports updates, or even offer an alternate game. This information may be generated through a host computer networked with gaming machine 700 on its own initiative or it may be obtained by request of the player using either one or more of the plurality of player-activated buttons 760; the game display itself, if game display 740 comprises a touch screen or similar technology; buttons (not shown) mounted about game display 740 which may permit selections such as those found on an ATM machine, where legends on the screen are associated with respective selecting buttons; or any player input device that offers the required functionality.

Cabinet housing 720 incorporates an electromechanical game display 740 comprising stepper motor-driven reels. However, in various embodiments, cabinet housing 720 or top box 750 may house one or more additional displays 753 or components used for various purposes including additional game play screens, animated "top glass," progressive meters or mechanical or electromechanical devices (not shown) such as, but not limited to, wheels, pointers or reels. The additional displays may or may not include a touch screen or touch glass system. An example of a touch glass system is disclosed in U.S. Pat. No. 6,942,571, entitled "Gaming Device with Direction and Speed Control of Mechanical Reels Using Touch Screen," which is hereby incorporated by reference.

Depending upon the occurrence of a winning outcome, a celebration sequence may be displayed on display 753 or a horn or other sounds may be emitted through speakers 790. A light 795 may be flashed in order to develop a sense of fanfare around a winning player and to alert casino floor personnel that a large win has occurred so that they may congratulate the winner, notify the winner of the payout, pay the winner, and/or reset gaming machine 700.

Figure 8:
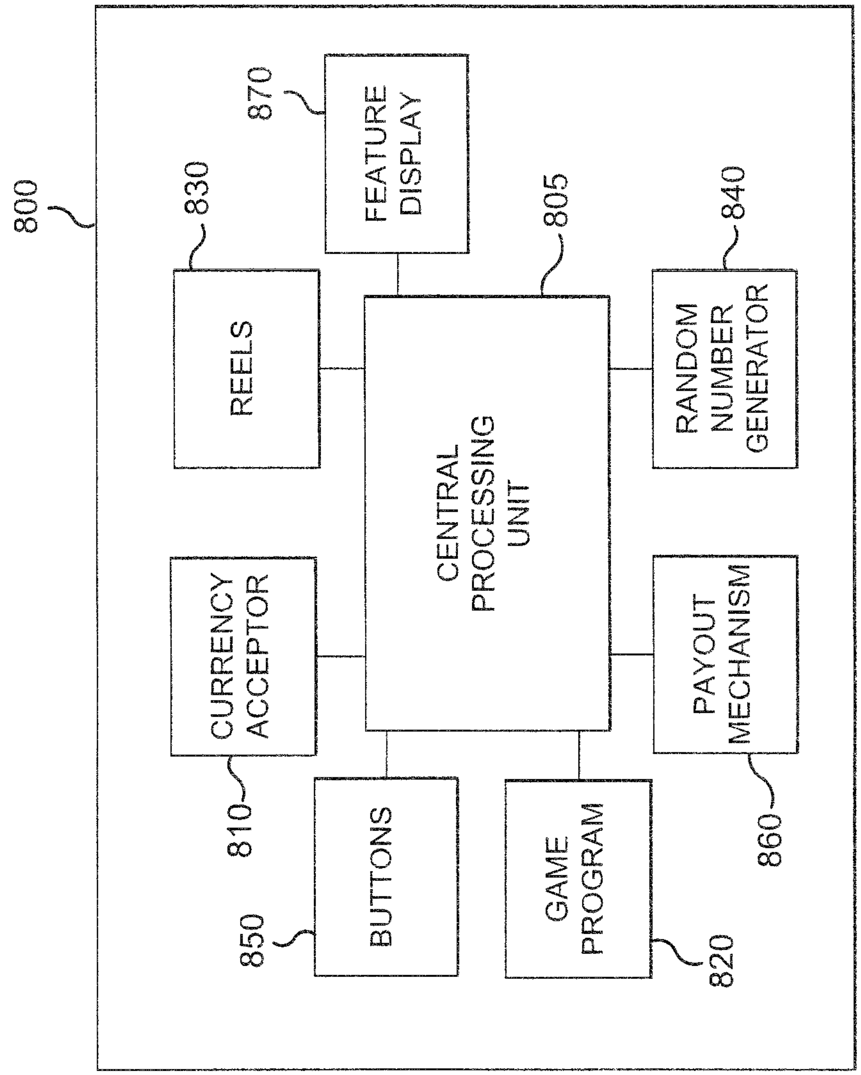
FIG. 8 is a block diagram of the physical and logical components of the gaming machine of FIG. 7.

In accordance with one embodiment of the present invention, FIG. 8 is a block diagram showing the interconnection 800 of physical and logical components of gaming machine 700. Currency acceptor 810 is typically connected to a conventional central processing unit ("CPU") 805, such as an Intel Pentium microprocessor mounted on a gaming motherboard, by a serial connection such as RS-232 or USB. The gaming motherboard may be mounted with other conventional components, such as are found on conventional personal computer motherboards, and loaded with a gaming machine operating system (OS), such as an Alpha OS installed within a Bally S9000, M9000 or CineVision™ slot machine. CPU 805 executes game program 820 that causes reels 830 to display a game. In one embodiment, game program 820 is a game entitled Reel Millions.

When a player has inserted a form of currency such as, for example and without limitation, paper currency, coins or tokens, cashless tickets or vouchers, electronic funds transfers or the like into currency acceptor 810, a signal is sent to CPU 805 which, in turn, assigns an appropriate number of credits for play. The player may further control the operation of the gaming machine, for example, to select the amount to wager via electromechanical or touchscreen buttons 850. The game starts in response to the player pushing one of buttons 850 or an alternate start mechanism such as a handle or touchscreen icon (not shown). Random number generator 840 responds to instructions from CPU 805 to provide a display of randomly selected indicia on reels 830. In some embodiments, random generator 840 may be physically separate from gaming machine 700; for example, it may be part of a central determination host system (not shown) which provides random game outcomes to CPU 805. Thereafter, the player may or may not interact with the game through electromechanical or touchscreen buttons 850 to change the displayed indicia. Finally, CPU 805 under control of game program 820 compares the final display of indicia to a pay table. The set of possible game outcomes may include a subset of outcomes related to the triggering of a feature game. In the event the displayed outcome is a member of this subset, CPU 805, under control of game program 820, may cause feature game play to be presented on feature display 870.

In one embodiment, reels 830 are electromechanical reels. Game program 800 includes reel spinning firmware to provide proper signals for driving multiple stepper motors (not shown), which, in turn, spin the reels 830. Preferably, the motors are driven using a "full step" excitation sequence in which a single motor step is preformed by changing the excitation on one of the two-phase inputs in a specified sequence. The sequence determines whether the direction implemented is forward or reverse. The reel drive pulse trains go through three distinct stages: acceleration, steady state, and deceleration. During acceleration, reels 830 are driven with a pulse frequency that is less than the maximum "start/stop" frequency. Typically, if a motor is attempted to be started with a high frequency pulse, the motor loses synchronization and slips. Therefore, preferably the drive frequency is incrementally increased until the steady state drive frequency is reached. At steady state, reels 630 are driven for a specified number of steps at the maximum drive frequency before going to the deceleration phase. During deceleration, the process is reversed and the drive frequency decreased until the stopping frequency is reached. Preferably, this procedure helps to prevent reels 830 from slipping past the proper stop position on deceleration. Finally, at the stopping point, the motor excitation signals are held constant.

In one embodiment, the primary game reels are not used for the feature play; instead, a wheel or other feature display 870 is used to present the feature game outcomes. The feature display may be an electromechanical device, may present the feature on a video display or both.

Predetermined payout amounts for certain outcomes, including feature game outcomes, are stored as part of game program 820. Such payout amounts are, in response to instructions from CPU 805, provided to the player in the form of coins, credits or currency via payout mechanism 860, which may be one or more of a credit meter, a coin hopper, a voucher printer, an electronic funds transfer protocol or any other payout means known or developed in the art.

In various embodiments of gaming machine 700, game program 820 is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with gaming machine 700 are stored in the same or a separate memory device (not shown). Some or all of game program 820 and its associated data may be loaded from one memory device into another, for example, from flash memory to random access memory (RAM).

Figure 9:
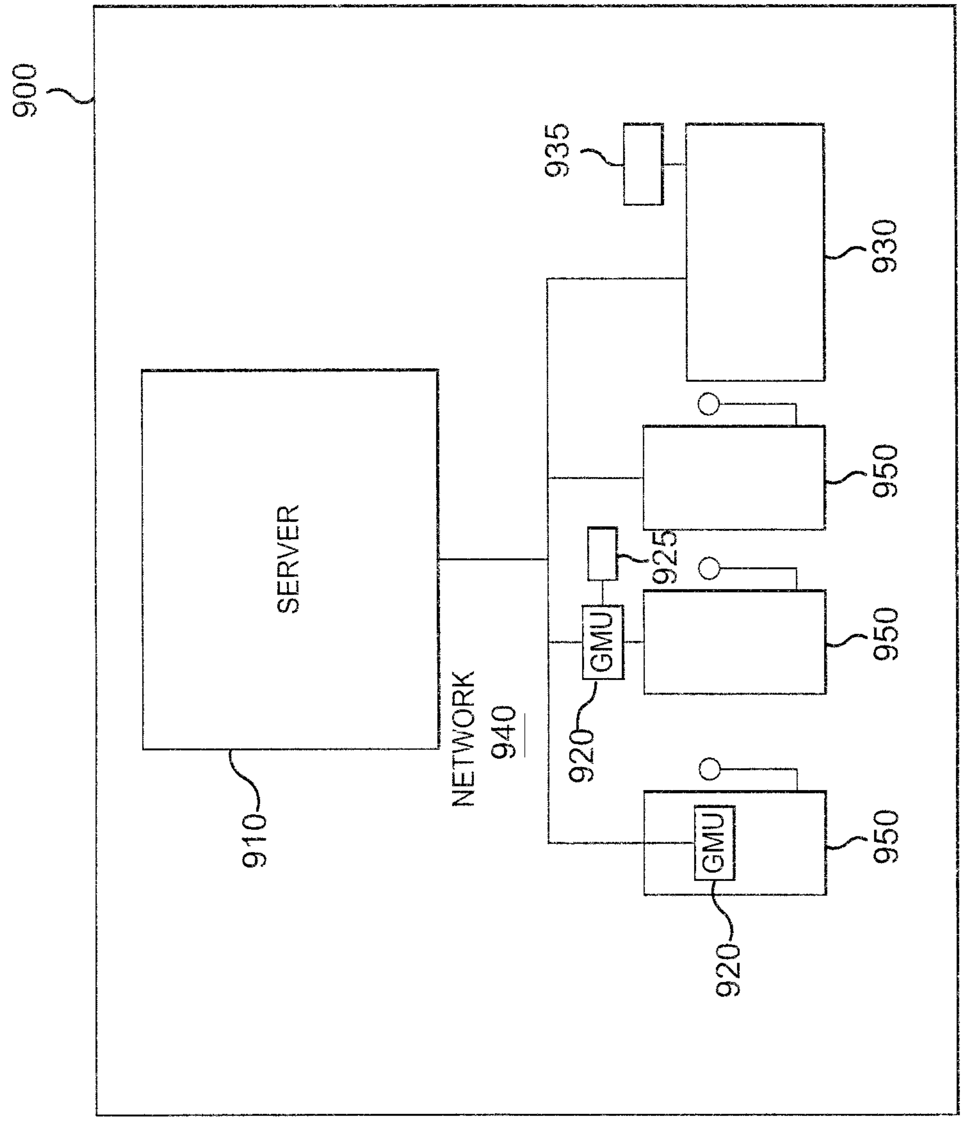
FIG. 9 is a schematic block diagram showing the hardware elements of a networked gaming system in accordance with one embodiment of the present invention.

Referring to FIG. 9, in accordance with one aspect of the invention, gaming system 900 includes host computer or server 910, gaming machines 950, and network 940 connecting gaming machines 950 to server 910. Additionally, gaming display computer 930 is shown connected to network 940. Server 910 may be selected from a variety of conventionally available servers. The type of server used is generally determined by the platform and software requirements of the gaming system. Examples of suitable servers are an IBM RS6000-based server, an IBM AS/400-based server or a Microsoft Windows-based server, but it should be appreciated that any suitable server may be used. It may also be appreciated that server 910 may be configured as a single "logical" server that comprises multiple physical servers or host computers. Gaming machines 950 operate similar to conventional peripheral networked terminals. Gaming machines 950 have a player interface such as a display, a card reader, and selection buttons through which gaming machines 950 interact with a player playing a wagering game having a multiple-progressive wheel game in accordance with various embodiments of the invention. The player interface is used for making choices such as the amount of a bet or the number of lines to bet. Gaming machines 950 also provide information to server 910 concerning activity on gaming machines 950 and provide a communication portal for players with server 910. For example, the player interface may be used for selecting different server-related menu options such as, but not limited to, transferring a specified number of credits from a player account onto the credit meter of the gaming machine, or for transferring credits from the gaming machine to a central player account.

In various embodiments, any of the gaming machines 950 may be a mechanical reel spinning slot machine, video slot machine, video poker machine, keno machine, video blackjack machine, or a gaming machine offering one or more of the above described primary games including a multiple-progressive wheel component. Networking components (not shown) facilitate communications across network 940 between the system server 910 and game management units 920 and/or gaming display control computers 930 that control displays for carousels of gaming machines. Game management units (GMU's) 920 connect gaming machines to networking components and may be installed in the gaming machine cabinet or external to the gaming machine. The function of the GMU is similar to the function of a network interface card connected to a desktop personal computer (PC) and it may contain tracking software which provides notification to the casino of certain events on a gaming machine 950, including wins. Depending upon the casino management system, payouts on large wins at gaming machines 950 may be made directly to a player account managed by the host computer; in which case, the player is notified by way of the GMU at gaming machine 950 that the player's account has been credited.

Some GMU's have much greater capability and can perform such tasks as presenting and playing a game having a multiple-progressive wheel game using a display 925 operatively connected to GMU 920. In one embodiment, GMU 920 is a separate component located outside the gaming machine. Alternatively, in another embodiment, the GMU 920 is located within the gaming machine. Optionally, in an alternative embodiment, one or more gaming machines 950 connect directly to the network and are not connected to a GMU 920. Displays related to games offering a multiple-progressive wheel game on gaming machines 950 or GMU displays 925 may also be presented on gaming display 935 by gaming display control computer 930. An example of a display control computer is disclosed in U.S. application Ser. No. 11/463,793, entitled "Reconfigurable Gaming Display and System," filed on Aug. 10, 2006, which is hereby incorporated by reference in its entirety.

A gaming system of the type described above also allows a plurality of games in accordance with the various embodiments of the invention to be linked under the control of server 910 for cooperative or competitive play in a particular area, carousel, casino or between casinos located in geographically separate areas.

One will appreciate that a gaming system may also comprise other types of components, and the above illustrations are meant only as examples and not as limitations to the types of components or games having a multiple-progressive wheel game. Additionally, it may further be appreciated that each of the games could be operated on a remote host computer such that a player initiates play with the host computer over a network via the player interface and gaming machine 950 operates the respective gaming and video displays in conjunction with the game whose play is controlled by the remote computer. In another example, the host computer provides a progressive controller which controls one or more progressive pools associated with networked games having multiple-progressive wheel games.

The various embodiments described above are provided by way of illustration only and should not be construed to limit the claimed invention. For example, a game in accordance with one or more aspects of the invention may be one of a set of primary games randomly selected for play following initiation of play by the player. For example, U.S. application Ser. No. 11/428,220, entitled "Multiple Primary Games Triggered by Random Number Generator," filed on Jun. 30, 2006, hereby incorporated in by reference its entirety, discloses a gaming machine including at least two distinct primary games. After receiving a wager, the gaming machine determines which primary game to activate. The selected primary game is activated and a game outcome is presented to the player on a game display. A payout may be awarded according to the game outcome. The availability of one or more of the games may be restricted based on the size of the wager. In another embodiment, a game in accordance with one or more aspects of the invention may be associated with a table game such a poker or blackjack. For example, a player may receive a chance to win a plurality of wheel-based progressives based on cards received during play of the table game, each spin of the wheel associated with one of the received cards and providing an opportunity to win a different progressive with each spin.

Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A wagering game device comprising:

at least one processor;

interfaces coupling the at least one processor to a player touch input device and a display;

a connection coupling the at least one processor to an external network;

at least one non-transitory memory device storing a commercial operating system and software under control of the processor for displaying a game on the display, wherein the game comprises:

a first game comprising a set of game plays, at least one of the game plays occurring after activation of the player touch input device;

a second game comprising a plurality of second game plays, the second game plays occurring after a triggering event of the first game; and at least one wheel capable of indicating awards which may be won as a result of the second game plays, at least one of the awards comprising one of a set of progressive awards;

wherein each second game play is visually_associated with a different aspect of the triggering event and wherein indicia on the wheel have been configured according to the different aspect of the triggering event; and one of the set of progressive awards is winnable only on its respective associated second game play;

wherein the entire set of progressive awards may be won as the result of the triggering event;

and wherein the at least one processor initiates game play with a remote host computer over the external network.

2. The game device of claim 1 wherein the triggering event comprises a predetermined first game outcome.

3. The game device of claim 1 wherein the triggering event comprises one or more trigger symbols.

4. The game device of claim 3 further comprising a separate second game outcome associated with each of the one or more trigger symbols.

* * * * *